Oct. 17, 1950 E. E. HANS 2,526,560
BUS HEATING ARRANGEMENT
Filed June 6, 1947 3 Sheets-Sheet 3

INVENTOR.
Edmund E. Hans
BY
*Gerard J. Baldwin*
ATTORNEY

Patented Oct. 17, 1950

2,526,560

UNITED STATES PATENT OFFICE 2,526,560

BUS HEATING ARRANGEMENT

Edmund E. Hans, Detroit, Mich.

Application June 6, 1947, Serial No. 752,924

4 Claims. (Cl. 98—10)

This invention relates to improvements in bus heating arrangements, and refers particularly to heating arrangements for busses having a depressed central alleyway extending lengthwise of the vehicle, seats extending laterally on each side of the alleyway, and floor sections extending laterally between the seats at a materially higher elevation than the alleyway. In busses so constructed, since there is usually no space beneath the seats through which air may flow longitudinally, heated air discharged rearwardly from adjacent the front of the vehicle flows almost entirely along the center over the alleyway and is of little comfort or benefit to seated passengers.

It is an object of the invention to provide a bus heating arrangement for such vehicles including a side heater unit arranged beneath a floor section on each side of the alleyway, air inlets along opposite sides of the bus through which air passes into the said units, and means for discharging air from the units into and along the alleyway whence at least some of this discharged air is drawn across the floor sections and across the lower extremities of seated passengers for return into the said inlets.

Another object of the invention is to provide such a bus heating arrangement including a front heater unit to discharge heated air at a relatively high velocity rearwardly along the alleyway, and side heater units having air inlets along opposite sides of the bus at the outer extremities of the floor sections and outlets through which heated air is discharged rearwardly into and along the alleyway. Thus some heated air from the alleyway is drawn across the floor sections into the inlets and the remainder flows to the rear of the vehicle where it is diverted first upwardly and then forwardly to the front heater unit at a higher elevation. Thus the course travelled by air flowing over the floor sections to the aforesaid inlets is far shorter than that travelled by air returning to the front heater unit so that air passing over the said floor sections and across the legs of seated passengers is much warmer than that returning at a higher elevation to the front heater unit, which is as it should be to provide maximum comfort for the passengers.

A further object of the invention is to provide a bus heating arrangement wherein the inlets into the side heater units are relatively so proportioned that substantially the same amount of heated air flows across each floor section into each inlet.

Having thus briefly stated some of the objects and advantages of the invention I will now describe it in detail with the aid of the accompanying drawings, in which.

Figure 1:
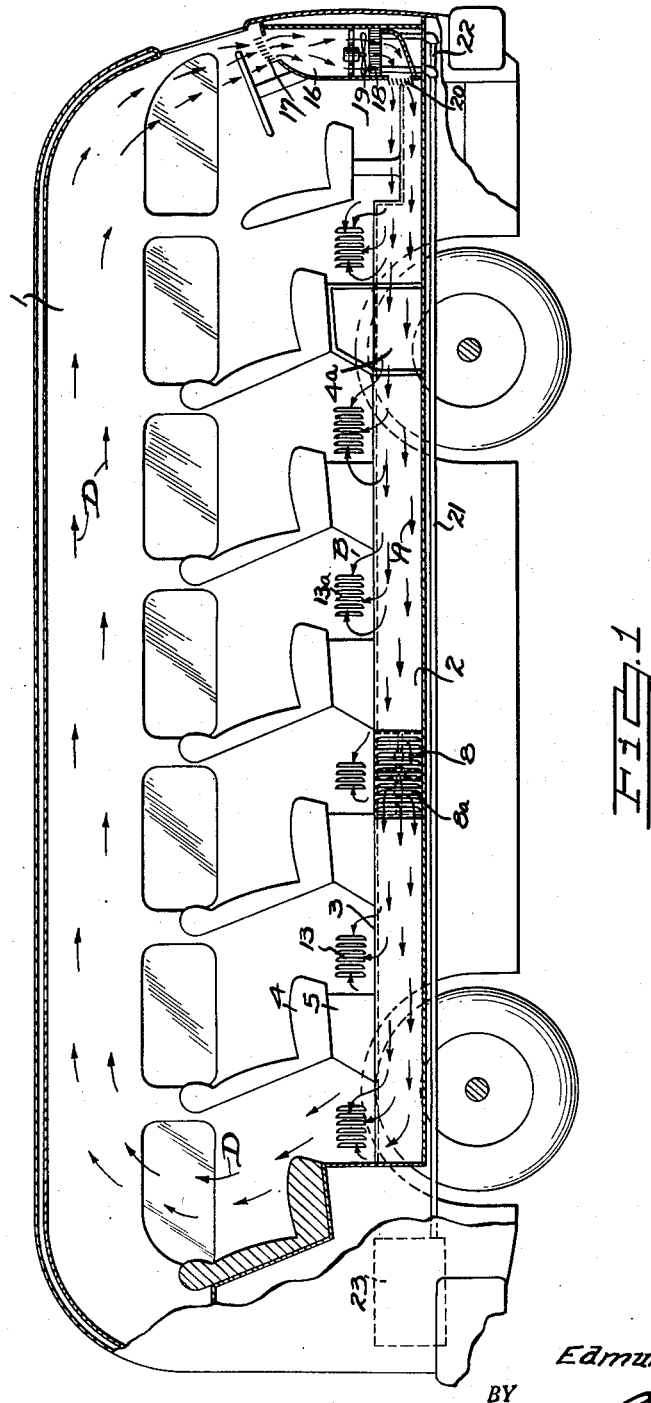
Figure 1 is a longitudinal view of a bus, mostly in section, showing my heating arrangement therein.
Figure 2:
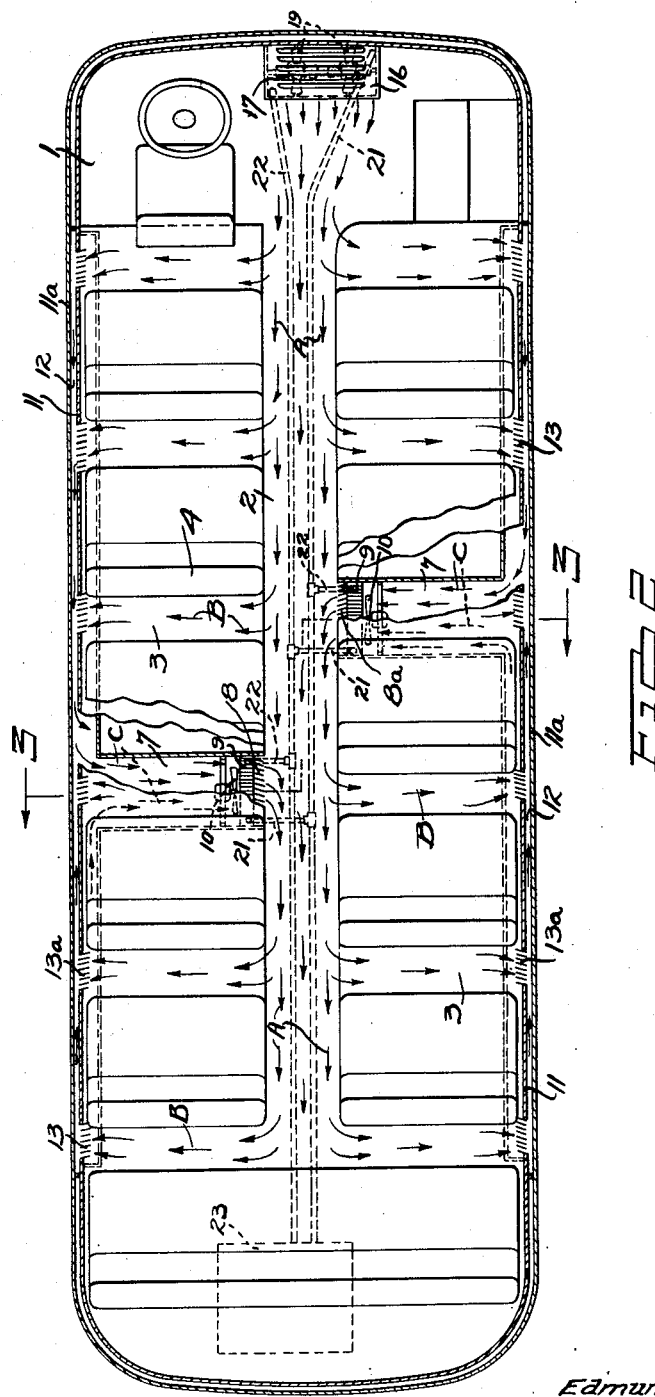
Figure 2 is a horizontal section thereof.
Figure 3:
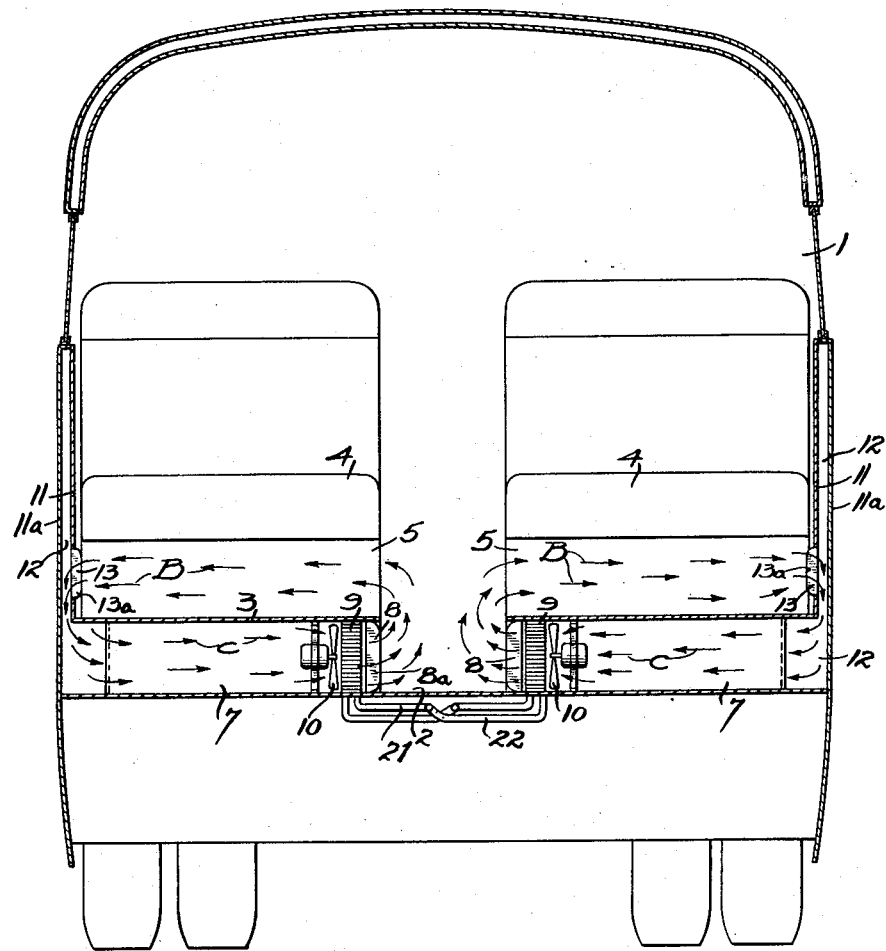
Figure 3 is a cross section taken on the line 3—3 of Figure 2.

Referring to the drawings, 1 designates a closed bus body having a central depressed alleyway 2 extending longitudinally therein. Projecting laterally from the alleyway on each side thereof are a plurality of raised floor sections 3 spaced from one another by transversely arranged seats 4 the bases 5 of which are usually provided with imperforate and substantially vertically disposed walls which prevent air passing longitudinally from one floor section to another. Beneath most, or all, of the seats 4 on both sides of the alleyway these imperforate walls are often used to enclose baggage compartments, one of which is shown at 4a in Figure 1, which extend from the alleyway to the adjacent side of the body.

Provided on each side of the alleyway 2 beneath one of the floor sections 3, but preferably not beneath transversely aligned floor sections, is a side heater unit, each of which includes a side casing 7 having an outlet 8 adjacent and opening into the alleyway 2. Each outlet preferably consists of a plurality of louvres 8a by which air flowing therethrough into the alleyway is deflected to travel longitudinally along the latter. In the present instance all the louvres in both side casings 7 are formed to deflect air rearwardly, but if the front heater 16, hereinafter referred to, is not employed then some of the louvres 8a in at least one of the side casings should be formed to deflect part of the air forwardly.

Mounted in and extending across each side casing 7 adjacent the outlet 8 is a vertical heater core 9, and 10 denotes a fan mounted in each casing 7 on the side of the core remote from the outlet 8 to discharge air through the said core and outlet. Formed in and extending throughout the major portion of the length of the vehicle between its inner and outer side walls 11 and 11a respectively are ducts 12 each of which is connected to one side casing 7. On each side of the vehicle, inlets 13 consisting usually of louvres 13a, are provided through the inner walls 11 a short distance about the floor sections 3; these inlets open into the ducts 12. The size of the inlets 13, controlled either by the size or number of the louvres 13a or both, varies according to their distance from the side casing 7 on that side of the vehicle so that substantially the same amount of air is induced across each floor section 3.

At the present time the outer portions of seats adjacent to side walls are often uncomfortably cold and drafty in winter due to leakage of air through the joints in the outer walls, which chills the inner walls and also passes through joints in the latter and between the said inner walls and the floor. In the present arrangement, however, the ducts 12 formed between the inner and outer walls 11 and 11a are under partial vacuum due to their connection to the side casings 7 in which the fans 10 are located. Consequently any cold air passing through the outer walls 11a into one of the ducts 12 is drawn into the casing 7 connected thereto for heating and circulation, so that there is no possibility for this cold air either to strike and chill the inner walls 11 or for it to leak through the latter. The arrangement, therefore, of the ducts 12 between the inner and outer walls provides additional comfort for passengers by eliminating the chilling of the inner walls 11 and drafts adjacent thereto.

In addition to the side heater units a front heater unit may be mounted in the front of the bus substantially centrally of its width. This front unit includes a casing 16 having a top air inlet 17, a horizontal heater core 18 therein, fans 19 therein above the core to discharge air downwardly therethrough, and a rearwardly disposed outlet 20 adjacent its underside through which heated air is discharged.

Both the heater cores 9 and the heater core 18 are connected by suitable piping 21 and 22 to the engine 23 so that hot water from the cooling system of the latter may circulate therethrough.

When the front heater unit and the casing 16 are employed as well as the side heaters 7 the operation is as follows: Heated air is discharged rearwardly along the center alleyway 2 from the outlet 20 as indicated by the arrows A. This air flow is augmented and accelerated by air heated in the side heater casings 7 and discharged through the outlets 8, the louvres 8a of which are in this instance all formed to direct the air rearwardly. An induced flow of heated air, both from the front heater casing 16 and from the side heater casings 7, passes from the alleyway 2 across each floor section 3, as indicated by the arrows B, to the inlets 13 whence this air is drawn through the ducts 12 into the casings 7, as indicated by the arrows C, by the fans 10. The latter discharge this air through the heater cores 9 back into the alleyway 2 through the outlets 8, so that it again mixes with air discharged rearwardly from the front casing 16. Some of the rearwardly flowing air passing along the alleyway 2 reaches the back of the vehicle where it is first upwardly and forwardly diverted, as indicated by the arrows D, so that it flows to the front at a higher elevation and is drawn into the inlet 17 of the front heater casing 16 by the fans 19 which discharge it through the heater core 18 and the outlets 20. It will thus be seen that heated air which follows the paths B and C travels a considerably shorter distance than the air which follows the courses A and D, and consequently air flowing across the lower extremities of passengers seated on the seats 4 is much hotter than that which flows back to the front heater casing at a higher elevation.

When the front heater unit and its casing 16 are omitted and the side heaters only are relied upon, the louvres 8a, as previously stated, are so formed that part of the air discharged through them flows forwardly and the remainder rearwardly to insure that a substantially uniform flow of heated air passes along all the paths B to the inlets 13. In this manner an ample flow of heated air may be provided across each floor section 3, and thus across the lower extremities of all passengers on the seats 4, to insure their comfort.

While in the foregoing the preferred constructions have been described and shown, it is understood that alterations and modifications may be made thereto provided they fall within the scope of the appended claims.

What I claim is:

1. In a closed vehicle body including top, bottom and side walls, flooring sections arranged on and spaced above said bottom wall, said sections being spaced laterally apart to define an aisle, said aisle being depressed relative to said sections, seats having imperforate bases mounted on said sections and extending from the aisle to the adjacent sides of the body for dividing the flooring into a plurality of transverse sections, each side wall of the body consisting of inner and outer portions spaced from one another to form ducts, the combination of a casing beneath the flooring sections on each side of the aisle, each casing having a heater core therein and an outlet opening into the aisle, one of the outlets being nearer the front of the body than the other, means in the outlets for diverting air flowing therethrough substantially longitudinally over the aisle in both directions, means connecting each duct in said side walls with one casing, said ducts having inlets thereinto positioned between the seats and above the flooring sections, a fan in each casing for discharging air through the heater core and outlet therein, said fans being adapted to induce air to flow across the flooring sections between the seats into the inlets and through the ducts and back into the casings for reheating and recirculation.

2. In a closed vehicle body including top, bottom and side walls, flooring sections arranged on and spaced above said bottom wall, said sections forming an aisle with said aisle being depressed relative to said sections, the combination of a casing in the front of the body having an air inlet adjacent the top and an outlet adjacent the bottom through which air is adapted to be rearwardly discharged along the aisle, a heater core in the casing, a fan in the casing adapted to discharge air through the core and outlet, a side casing beneath the flooring sections intermediately of the length of the body having a heater core therein and an outlet opening into the aisle, means in the outlet opening for diverting air passing therethrough so that it flows rearwardly along the aisle, one side wall of the body consisting of inner and outer portions spaced apart from one another to form a duct on that side of the body to which the flooring sections extend, said duct being connected to the side casing and having inlet openings therein above said sections, a fan in the side casing by which air in the latter is discharged through the heater core and outlet therein, said fan inducing some of the rearwardly flowing air across the flooring and into the duct through the inlet openings for return to the side casing for reheating and recirculation, and some of the rearwardly flowing air being upwardly and then forwardly diverted at the rear of the body so that it flows forward at a higher level, the fan in the front casing inducing this forwardly flowing air into said casing for reheating and recirculation.

3. In a closed vehicle body including top, bottom and side walls, flooring sections arranged on and spaced from said bottom wall, said sections being spaced laterally apart to define an aisle, said aisle being depressed relative to said sections, the combination of a front casing mounted centrally in the body at the front thereof, said casing having an inlet adjacent the top and an outlet adjacent the bottom through which air is adapted to be rearwardly discharged over and adjacent the aisle, a heater core in the casing and a fan therein to discharge air through the core and outlet, a side casing on each side of the aisle beneath the flooring sections intermediately of the length of the body, each side casing having a heater core therein and an outlet opening into the aisle, means in the outlets for diverting air passing therethrough so that it flows rearwardly with air discharged by the front casing, each side wall consisting of inner and outer portions spaced apart to form ducts, each duct being connected to the side casing on that side of the body and having inlet openings thereinto above the flooring sections, a fan in each side casing for discharging air through the heater core and outlet therein, said last mentioned fans being adapted to induce some air from over the aisle to flow outwardly across the flooring sections to the inlets and through the ducts into the side casings for reheating and recirculation, and some of the rearwardly flowing air over the aisle reaching the back of the body being then upwardly and forwardly diverted and returned at a higher level to the front casing for reheating and recirculation.

4. In a closed vehicle body including, top, bottom and side walls, and seats mounted transversely in the body over the bottom wall, each seat extending from one side wall almost to the center of the body whereby a central aisle is defined between the adjacent ends of the seats, the combination of a front casing mounted centrally in the body at the front thereof, said casing having an inlet adjacent the top and an outlet adjacent the bottom through which air is adapted to be rearwardly discharged along the aisle, a heater core in the casing and a fan therein to discharge air through the core and outlet, a side casing on each side of the aisle upon the bottom wall, each casing having a heater core therein and an outlet opening into the aisle, means in the outlets for diverting air passing therethrough so that it flows rearwardly with the air discharged from the front casing, each side wall consisting of inner and outer portions spaced apart to form ducts, each duct being connected to the side casing on that side of the body and having inlet openings therein above the bottom wall and through the inner portion of the side wall, a fan in each side casing for discharging air through the heater core and outlet therein, said last mentioned fans being adapted to discharge air into the air stream flowing rearwardly from the front casing, and being also adapted to induce a flow of air from the rearwardly flowing air stream across the body through the inlets into the ducts, whereby part of the rearwardly flowing air is diverted laterally and the remainder passes at a relatively low elevation to the rear of the body where it is upwardly and then forwardly diverted so that it returns at a higher elevation to the front casing for reheating and recirculation.

EDMUND E. HANS.

REFERENCES CITED

The following references are of record in the file of this patent:

UNITED STATES PATENTS

| Number | Name | Date |
| --- | --- | --- |
| 1,915,149 | Blackhall et al. | June 20, 1933 |
| 2,027,097 | Hanson | Jan. 7, 1936 |
| 2,093,859 | Austin | Sept. 21, 1937 |
| 2,222,081 | Leigh | Feb. 3, 1939 |
| 2,185,855 | Kysor | Jan. 2, 1940 |
| 2,382,712 | Hans | Aug. 14, 1945 |